UNITED STATES PATENT OFFICE.

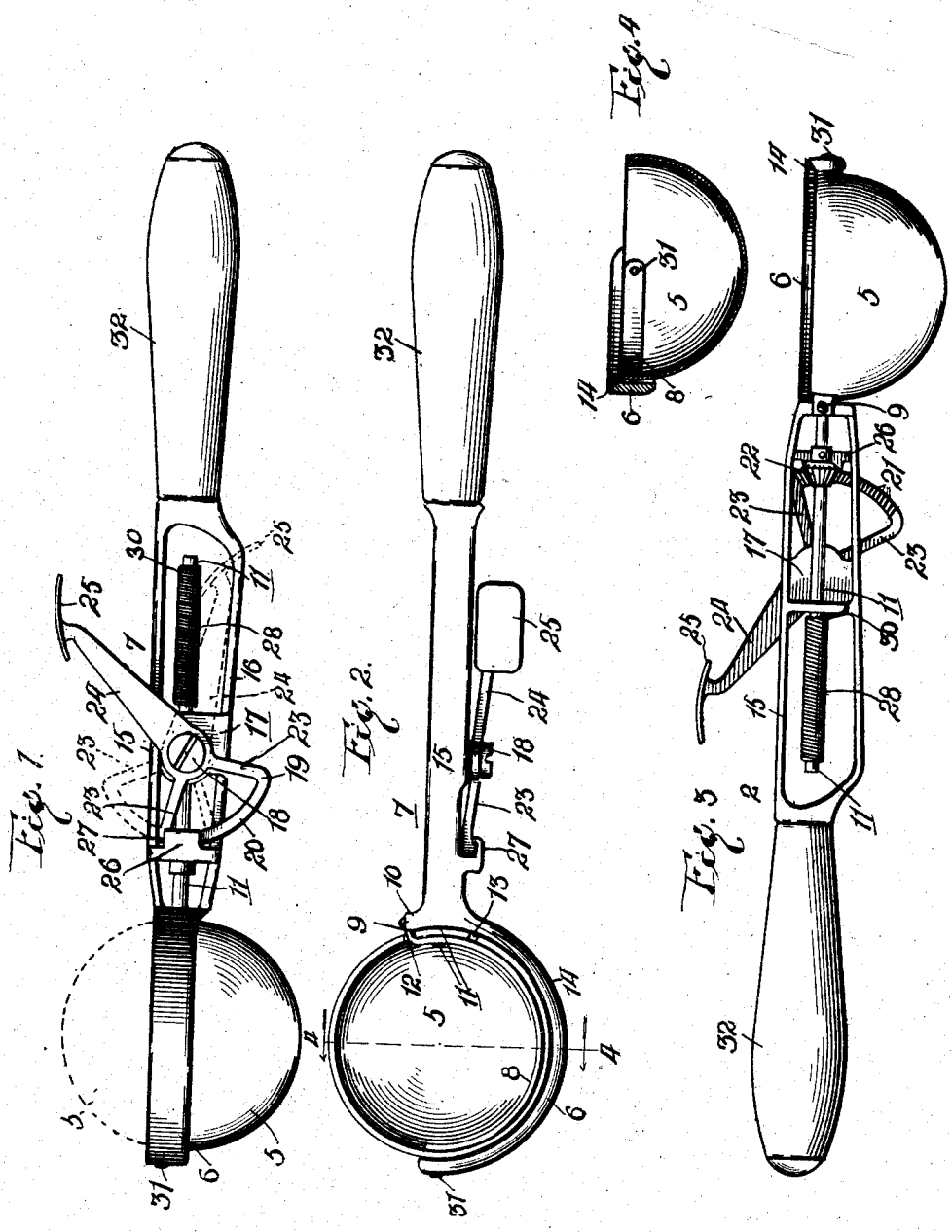

DOSIER H. MOSTELLER, OF CHICAGO, ILLINOIS, ASSIGNOR TO THE MOSTELLER MANUFACTURING COMPANY, OF CHICAGO, ILLINOIS, A CORPORATION OF ILLINOIS.

ICE-CREAM SPOON.

No. 864,550.     Specification of Letters Patent.     Patented Aug. 27, 1907.

Application filed January 19, 1907. Serial No. 353,096.

*To all whom it may concern:*

Be it known that I, DOSIER H. MOSTELLER, a citizen of the United States, residing at Chicago, in the county of Cook and State of Illinois, have invented certain new and useful Improvements in Ice-Cream Spoons, of which the following is a specification.

This invention relates to ice cream spoons of the general character described and illustrated in my Patent No. 825,147, dated July 6, 1906, and has for its object to improve on certain features of construction as will hereafter appear.

The invention particularly relates to the formation and arrangement of an outer scraper which serves to scrape off the ice cream from the outer surface of the revoluble bowl; to the construction and mode of attachment of the inner scraper; to the construction of the rack and thumb lever; to the formation of the frame; and to the features of construction and combination of parts hereinafter described and claimed.

In the drawings Figure 1 is a side elevation of the spoon in normal position; Fig. 2 a top or plan view of the same; Fig. 3 a side elevation taken from the side opposite to that shown in Fig. 1; and Fig. 4 a sectional elevation of the bowl taken on line 4—4 of Fig. 2 looking in the direction of the arrow.

The spoon comprises a hemispherical bowl 5, which is adapted to revolve through a half circle, as shown in dotted lines in Fig. 1, and is pivoted and supported by means of an outer scraper bar 6 of semi-circular formation, which is formed integrally on the framework 7 of the spoon handle. The spoon bowl moves between the outer scraper bar 6 and an inner scraper bar 8 concentric with the outer bar and in close proximity to the inner surface of the bowl. Both the inner and outer bars are stationary, and the inner bar at its rear end is provided with an attaching angularly disposed attaching ear 9 which is rigidly secured to a boss 10 on the side of the frame opposite to that to which the outer scraper bar is attached. The attached end of the inner bar is extended beyond the axial line of the bowl, and the inner bar serves as a mounting for the forward end of a rock shaft 11 which is mounted within the frame and is adapted to oscillate the bowl in order to discharge the ice cream.

In order to permit the bowl to have an unimpeded movement through an arc of substantially 90 degrees, the rear edge of the bowl is provided with cuts or recesses 12 and 13, shown in Fig. 2, the former of which serves to receive the attaching ear 9 when the bowl is in normal or lowered position; and the latter of which embraces the ear when the bowl is swung around into discharging position. These cuts or recesses are necessary in view of the fact that the outer edge of the scraper bar is normally in substantial alinement with the rim of the bowl, and the attaching ear would interfere with the movement of the bowl were the cuts not provided. The upper edge 14 of the outer scraper bar 6 normally extends above the rim of the bowl, as shown in Fig. 4, and is beveled to serve as a cutting edge during the operation of dipping up the ice cream. By forming the outer bar in the manner indicated and raising its lip or edge above the edge of the bowl, the latter is relieved from strain and may be made of much lighter material than would otherwise be possible.

The frame 7 comprises an upper rail 15 and a lower rail 16 which are connected at an intermediate point by means of a cross wall 16 which, on one side, is carried forward to provide a lateral wall 17 of sufficient size to receive the inner end of a pivot screw 18, upon which the operating rack 19 is mounted. The rack is of segmental formation at its forward or operating end 20, which end is provided with teeth 21 which mesh with a bevel pinion 22 on the shaft 11. The toothed portion of the rack is connected with the main or body portion by radially extending arms 23, which gives the rack, as a whole, a firm and rigid, and at the same time a light formation. The rack has formed therewith a handle 24 terminating at its upper end in a thumb plate 25 which is adapted to be moved from the normal position shown in full lines in Fig. 1 into the discharging position indicated in dotted lines in the same figure. The forward or toothed end of the rack operates within a guideway 26, which prevents any lateral movement, and serves to hold the rack into engagement with the pinion at all times. The movement of the rack is limited by means of a stop 27 at the upper extremity of the end 20 which, when the parts are in normal position, abuts against the upper edge of the guideway 26. The guideway, like the cross wall 16, the side wall 17, and the outer scraper bar, is formed integrally with the framework, which simplifies the construction of the spoon to a marked degree.

In order to hold the bowl in normal position, a coil spring 28 is provided which encircles the rear end of the shaft within the space behind the cross wall 16, which serves as a rear bearing for the shaft. The rear end 29 of the spring is secured to the shaft, and the forward end 30 is looped around the cross wall, which arrangement permits the shaft to be revolved under tension of the coil spring, which, however, serves to return the shaft to normal position.

The bowl, at its forward edge, revolves around a pivot pin 31 which passes through the bowl and serves to connect the inner and outer scrapers together. The spoon is completed by the addition of a hand piece or handle 32 of any suitable style.

In use the ice cream is scooped up by moving the spoon in such a manner that the beveled edge of the outer scraper will serve as a cutting edge, and after the bowl is filled with ice cream it can be discharged into a dish or glass by holding the spoon in the position shown in Fig. 1, with the open side of the bowl up, and thereafter depressing the thumb lever in the position indicated in dotted lines, which action of the thumb lever serves to move the rack and thereby operate the shaft, thereby turning the bowl upside down in the position indicated in dotted lines. As the bowl is turned between the stationary inner and outer scrapers, which closely abut against the inner and outer surfaces of the bowl, the ice cream will be scraped off from the outside and cut away from the surface of the inside of the bowl, permitting the cream to be discharged in the form of a hemispherical block of proper size. By forming the outer scraper integrally with the frame, it can be made sufficiently strong and rigid to withstand the strain of continued usage, and the cutting edge or lip projected above the edge of the bowl, serves to prevent injury to the working portions of the device.

In my patent I have shown a "reinforcing half ring", which encircles the outer rim of the bowl, but such ring is not projected above the edge of the bowl and is on the side opposite to that on which the inner scraper bar is located. I have found that better results are obtained by projecting the upper edge or lip of the outer bar or rim of the bowl, and by locating both the inner and outer bars on the same side of the bowl. In fact, this is the only manner in which both bars can be made to serve as scrapers in the manner intended.

The rack and finger lever heretofore described is one which is highly satisfactory in that it permits a wide range of movement without necessitating the use of a lever of undue length. The location of the lever is one which permits easy manipulation by the thumb, and the provision of the guideway serves to relieve the pivot of strain, and at the same time prevents any lateral movement or wobbling which might otherwise take place.

What I claim as new and desire to secure by Letters Patent is:

1. In an ice cream spoon, the combination of a framework, a bowl movably mounted thereon and having its axis in alinement with the handle, an inner scraper within the bowl rigidly secured to the handle, and a fixed outer scraper outside of and concentric with the bowl and adjacent to the inner scraper, substantially as described.

2. In an ice cream spoon, the combination of a frame, a bowl rotatably mounted with respect to the frame and having its axis in alinement with the handle, an inner scraper fixedly mounted with respect to the handle and on the inside of the bowl, an outer scraper similarly mounted and adjacent to the inner scraper on the outside of and concentric with the bowl, and means for rotating the bowl, substantially as described.

3. In an ice cream spoon, the combination of a frame, a bowl rotatably mounted with respect to the frame and having its axis in alinement with the handle, an inner scraper fixedly mounted with respect to the frame and on the inside of the bowl, an outer scraper similarly mounted on the outside of the bowl and adjacent to and concentric with the inner scraper, and mechanism secured to the frame and adapted to be operated by the thumb of the user for rotating the bowl, substantially as described.

4. In an ice cream spoon, the combination of a frame, a hemispherical bowl rotatably mounted with respect thereto, means for rotating the bowl, an inner fixed scraper and an outer fixed scraper having its lip or edge normally raised above the adjacent edge of the bowl to afford a cutting edge in scooping up the ice cream, substantially as described.

5. In an ice cream spoon, the combination of a frame, a round bowl rotatably mounted with respect thereto, a rod connected with the bowl, means for revolving the rod, a fixed inner scraper within the bowl and connected with the frame, a fixed outer scraper outside of the bowl and connected with the frame and having a lip or edge normally extending above the adjacent rim of the bowl, substantially as described.

6. In an ice cream spoon, the combination of a frame having formed therewith a semi-circular outer scraper, a round bowl partially embraced on the outer scraper and pivoted between the frame and the outer end of the outer scraper, an inner scraper on the inside of the bowl and adjacent to the outer scraper, and hand operated means secured to the frame for revolving the bowl on its axis in alinement with the handle, substantially as described.

7. In an ice cream spoon, the combination of a frame having formed therewith a semi-circular concentric outer scraper, a round bowl partially embraced by the outer scraper and pivoted between the frame and the outer end of the outer scraper, and having its axis in alinement with the handle, an inner scraper on the inside of the bowl and adjacent to the outer scraper, a rod secured to the bowl and journaled within the frame, a pinion on the rod, a rack in engagement with the pinion, a guide for holding the rack in engagement, a thumb lever for moving the rack, and a spring for returning the parts to normal condition, substantially as described.

DOSIER H. MOSTELLER.

Witnesses:
　WALKER BANNING,
　EPHRAIM BANNING.